United States Patent
Burkhard et al.

(10) Patent No.: US 8,360,099 B2
(45) Date of Patent: Jan. 29, 2013

(54) FAILURE PROTECTION APPARATUS FOR A PRESSURE CONTROL ASSEMBLY

(75) Inventors: Alan Wayne Burkhard, Fort Thomas, KY (US); Michael Scott Sawyer, Katy, TX (US); Roger Lane Suter, Katy, TX (US)

(73) Assignee: M-I L.L.C., Houston, TX (US)

( * ) Notice: Subject to any disclaimer, the term of this patent is extended or adjusted under 35 U.S.C. 154(b) by 1396 days.

(21) Appl. No.: 11/683,317

(22) Filed: Mar. 7, 2007

(65) Prior Publication Data

US 2007/0209715 A1    Sep. 13, 2007

Related U.S. Application Data

(60) Provisional application No. 60/780,093, filed on Mar. 8, 2006.

(51) Int. Cl.
*F16K 37/00* (2006.01)

(52) U.S. Cl. .................. 137/557; 251/29; 137/206

(58) Field of Classification Search ............. 251/25, 251/29, 28; 137/557, 565.14, 206, 488, 485
See application file for complete search history.

(56) References Cited

U.S. PATENT DOCUMENTS

| | | | |
|---|---|---|---|
| 4,062,379 A | | 12/1977 | Clinton |
| 4,132,383 A | * | 1/1979 | Clinton .................... 251/29 |
| 4,176,617 A | * | 12/1979 | Pilipski .................... 137/557 |
| 4,355,784 A | | 10/1982 | Cain |
| 4,518,146 A | | 5/1985 | Stinson et al. |
| 4,565,349 A | * | 1/1986 | Tomlin ..................... 251/29 |
| 4,643,390 A | | 2/1987 | Karr, Jr. et al. |
| 4,647,004 A | * | 3/1987 | Bihlmaier ................. 251/28 |
| 4,825,802 A | * | 5/1989 | Le Bec ..................... 137/557 |
| 6,253,787 B1 | | 7/2001 | Suter et al. |

OTHER PUBLICATIONS

International Search Report and Written Opinion, mailed Aug. 21, 2007, for PCT/US2007/063598 filed Mar. 8, 2007.

* cited by examiner

*Primary Examiner* — Craig Schneider
*Assistant Examiner* — Andrew J Rost
(74) *Attorney, Agent, or Firm* — David J. Smith; David Cate

(57) ABSTRACT

A failure protection apparatus including an air source providing air having an air pressure, a first valve in fluid communication with the air source permitting a control fluid to flow to a pressure control assembly when the air pressure is at least a minimum pressure and preventing flow of the control fluid to the assembly when the air pressure is below a minimum pressure, the assembly containing control fluid at a predetermined pressure that is maintained when the air pressure is below the minimum pressure, a second valve in communication with the air source permitting communication of air between an inlet and an outlet when the air pressure is below the minimum pressure, a third valve in communication with the air source, a pressure container in communication with the third valve outlet and having an outlet that feeds air to the second valve to actuate a warning device attached thereto.

16 Claims, 3 Drawing Sheets

FAILURE PROTECTION APPARATUS FOR A PRESSURE CONTROL ASSEMBLY

This application claims priority to Provisional Patent Application 60/780,093 filed on Mar. 8, 2006 and entitled, "A Failure Protection Apparatus for a Pressure Control Assembly" the contents of which are incorporated herein by reference for all purposes.

BACKGROUND OF INVENTION

This invention relates to an apparatus for freezing the set point pressure on a hydraulic choke when air pressure in the choke drops below a normal operating range and for returning the choke to normal operation when air pressure returns to the normal range.

There are many applications in which there is a need to control the back pressure of a fluid flowing in a system. For example, in the drilling of oil wells, it is customary to suspend a drill pipe in the well bore with a bit on the lower end thereof and, as the bit is rotated, to circulate a drilling fluid, such as a drilling mud, down through the interior of the drill string, out through the bit, and up the annulus of the well bore to the surface. This fluid circulation is maintained for the purpose of removing cuttings from the well bore, for cooling the bit, and for maintaining hydrostatic pressure in the well bore to control formation gases and prevent blowouts and the like. In those cases where the weight of the drilling mud is not sufficient to contain the bottom hole pressure in the well, it becomes necessary to apply additional back pressure on the drilling mud at the surface to compensate for the lack of hydrostatic head and thereby keep the well under control. Thus, in some instances, a back pressure control device is mounted in the return flow line for the drilling fluid.

Back pressure control devices are also necessary for controlling "kicks" in the system caused by the intrusion of salt water or formation gases into the drilling fluid which may lead to a blowout condition. In these situations, sufficient additional back pressure must be imposed on the drilling fluid such that the formation fluid is contained and the well controlled until heavier fluid or mud can be circulated down the drill string and up the annulus to kill the well. It is also desirable to avoid the creation of excessive back pressures which could cause drill string to stick, or cause damage to the formation, the well casing, or the well head equipment.

However, maintenance of an optimum back pressure on the drilling fluid is complicated by variations in certain characteristics of the drilling fluid as it passes through the back pressure control device. For example, the density of the fluid can be altered by the introduction of debris or formation gases, and/or the temperature and volume of the fluid entering the control device can change. Therefore, the desired back pressure will not be achieved until appropriate changes have been made in the throttling of the drilling fluid in response to these changed conditions. Conventional devices generally require manual control of and adjustments to the choking device orifice to maintain the desired back pressure. However, manual control of the throttling device involves a lag time and generally is inexact.

U.S. Pat. Nos. 4,355,784 and 6,253,787, assigned to the assignee of the present application, disclose apparatuses and methods for controlling back pressure of drilling fluid in the above environment which address the problems set forth above. According to these arrangements, a balanced choke device moves in a housing to control the flow and back pressure of the drilling fluid. One end of the choke device is exposed to the pressure of the drilling fluid and its other end is exposed to the pressure of a control fluid. In operation, a "throttling" area defined between an end of a choke member and a choke seat, is greater than the area of a discharge passage. Thus, there is no back pressure imparted to the drilling fluid as it passes through an inlet passage and the discharge passage and discharges from the housing for recirculation. When it is desired to exert a back pressure on the drilling fluid in the passage, control fluid from an external source is introduced at a predetermined set point pressure into the passage and thus passes into chambers where it applies pressure to the back side of the choke member. As drilling fluid passes from the well being drilled into and through the inlet passage and into the housing, the effective opening or passage between the inlet passage and the discharge passage is controlled by the axial movement of the choke member relative to the choke seat. However, when a well has been drilled and is ready for production, alternative equipment is used than that used for drilling the well.

Typically, the pressure control apparatus is removed when the well is ready for production and replaced with BOPs. As the pressure control apparatus such as that described above is removed, the source of external fluid is disconnected. The hydrostatic pressure of the mud circulation system should be in equilibrium before the well is killed. For a variety of reasons, including the failure of monitoring devices and operator error, pressure in the throttling area may be present. When the external fluid source is disconnected, the choke member is no longer counterbalanced by the control fluid and the increased pressure is dissipated through the choke and any downstream equipment, causing potential damage to the equipment and risk of injury or death to people nearby.

Therefore, what is needed is a method and system for maintaining back pressure on the drilling fluid when the external fluid source is disengaged along with a warning system to alert an operator if the drilling fluid in the throttling area is under pressure.

Thus, a safety mechanism has been invented to prevent the immediate loss of pressure through the pressure control apparatus when the external fluid source is disconnected.

SUMMARY

In one aspect, the present invention relates to a failure protection apparatus. The apparatus may include an air source providing air having an air pressure, a first valve in fluid communication with the air source permitting fluid communication of a control fluid between a first fluid port and a second fluid port when the air pressure is at least a minimum air pressure and preventing fluid communication of the control fluid between the first fluid port and the second fluid port when the air pressure is below the minimum air pressure, a second valve in fluid communication with the air source preventing communication of air between an air inlet and an air outlet when the air pressure is at least the minimum air pressure and permitting communication of air between the air inlet and the air outlet when the air pressure is below the minimum air pressure, a third valve in fluid communication with the air source permitting communication of air to a third valve outlet when the air pressure is at least the minimum air pressure and preventing communication of air to the third valve outlet when the air pressure is below the minimum air pressure, a pressure container in fluid communication with the third valve outlet and having an air outlet, wherein the air outlet is in fluid communication with the air inlet of the second valve, and a warning device in fluid communication with the air outlet of the second valve and operable to emit sound when air is communicated from the air outlet.

Another aspect the invention relates to a failure protection apparatus including an air source providing air having an air pressure, a first valve in fluid communication with the air source permitting fluid communication of a control fluid between a pressurized hydraulic reservoir and a chamber in a housing of a pressure control assembly when the air pressure from the air source is at least a minimum air pressure and preventing fluid communication of the control fluid when the air pressure from the air source is below the minimum air pressure, a second valve having a first air inlet in fluid communication with the air source, a second air inlet, and an air outlet, wherein the second valve prevents communication of air between the second air inlet and the air outlet when the air pressure from the air source is at least the minimum air pressure and permitting communication of air between the second air inlet and the air outlet when the air pressure from the air source is below the minimum air pressure, a third valve having a third valve inlet and a third valve outlet, wherein the third valve inlet is in fluid communication with the air source and wherein the third valve permits communication of air from the third valve inlet to the third valve outlet when the air pressure from the air source is at least the minimum air pressure and preventing communication of air between the third valve inlet and the third valve outlet when the air pressure is below the minimum air pressure, a pressure container in fluid communication with the third valve outlet and having an air outlet, wherein the air outlet is in fluid communication with the second air inlet of the second valve, and an air-actuated warning device in fluid communication with the air outlet of the second valve, wherein the warning device emits a sound when air is communicated from the pressure container through the second valve.

Yet another aspect of the present invention relates to a pressure control apparatus including an air source providing air having an air pressure to an air source outlet, a pressure control assembly that includes a housing having an inlet passage, an axial bore a portion of which forms an outlet passage, and a chamber, a choke member adapted for movement in the housing to control the flow of fluid from the inlet passage to the outlet passage, the fluid applying a force on one end of the choke member, a source of control fluid connected to the chamber so that the control fluid applies an equal force on the other end of the choke member to control the position of the choke member in the housing in a manner to exert a back pressure on the fluid in the inlet passage, wherein the air source is in fluid communication with the source of control fluid to provide air pressure on the control fluid, a mandrel fixed to the housing and extending in another portion of the bore, and a shuttle connected to the choke member and slidably mounted on the mandrel within the latter bore portion, and the apparatus further including a first valve in fluid communication with the air source and permitting fluid communication of the control fluid between the source of control fluid and the chamber of the pressure control assembly when the air pressure from the air source is at least a minimum air pressure and preventing fluid communication of the control fluid when the air pressure from the air source is below the minimum air pressure, a second valve having a first air inlet in fluid communication with the air source, a second air inlet, and an air outlet, wherein the second valve prevents communication of air between the second air inlet and the air outlet when the air pressure from the air source is at least the minimum air pressure and permitting communication of air between the second air inlet and the air outlet when the air pressure from the air source is below the minimum air pressure, a third valve having a third valve inlet and a third valve outlet, wherein the third valve inlet is in fluid communication with the air source and wherein the third valve permits communication of air from the third valve inlet to the third valve outlet when the air pressure from the air source is at least the minimum air pressure and preventing communication of air between the third valve inlet and the third valve outlet when the air pressure is below the minimum air pressure, a pressure container in fluid communication with the third valve outlet and having an air outlet, wherein the air outlet is in fluid communication with the second air inlet of the second valve, and a warning device in fluid communication with the air outlet of the second valve, wherein the warning device emits a sound when air is communicated from the pressure container through the second valve.

Other aspects and advantages of the claimed subject matter will be apparent from the following description and the appended claims.

DETAILED DESCRIPTION

Figure 1:
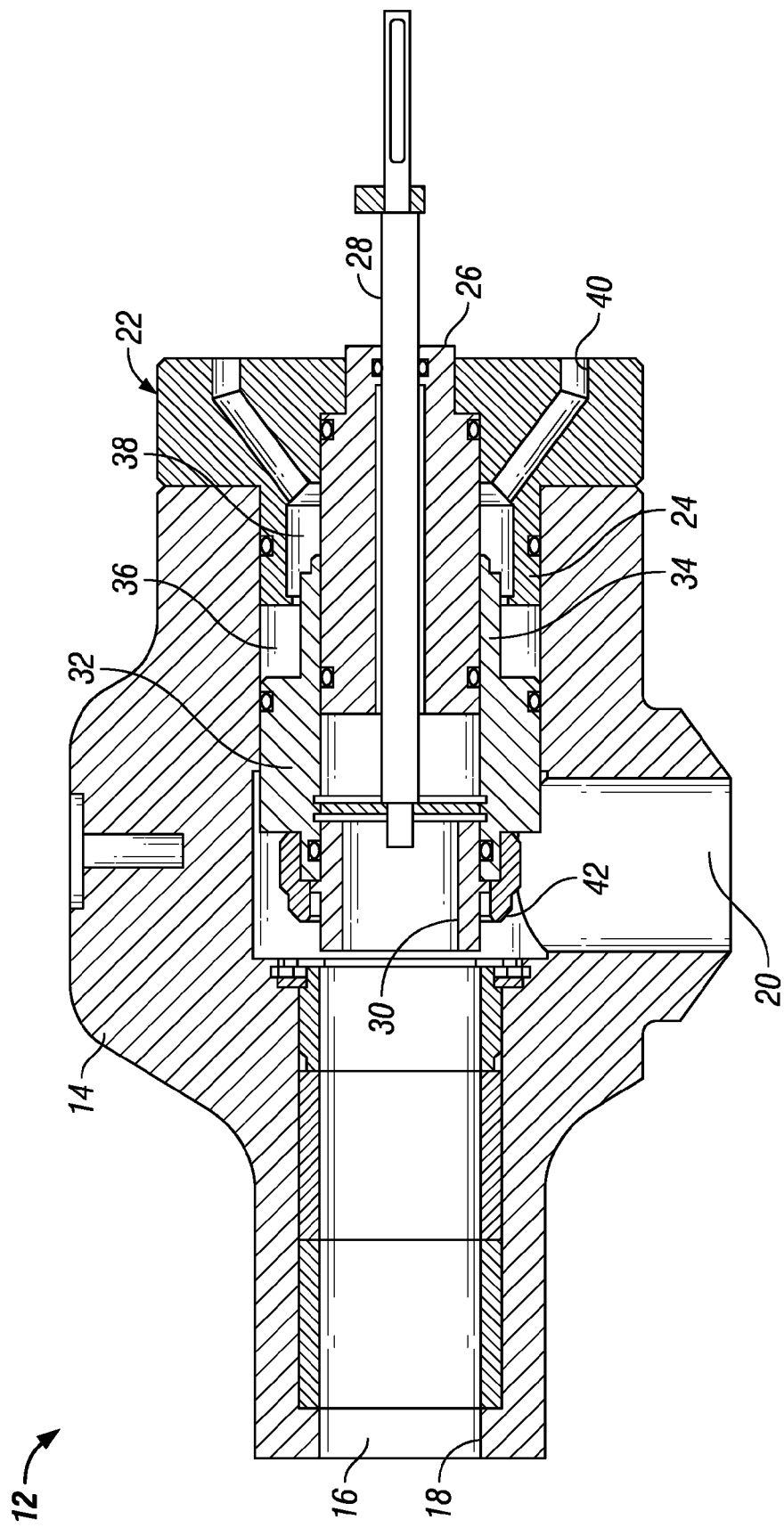
FIG. 1 is a cross sectional view of a prior art pressure control assembly.

The claimed subject matter relates to a failure protection apparatus 100 (shown in FIG. 2) for a pressure control assembly 12 of the type shown in FIG. 1. Pressure control assembly 12 includes a housing 14 having an axial bore 16 extending through its length and having a discharge end 18. A radially extending inlet passage 20 is also formed in the housing 14 and intersects the bore 16. Drilling fluid from a downhole well is introduced into the inlet passage 20, passes through the housing 14 and normally discharges from the discharge end of the bore 16 for recirculation.

A bonnet 22 is secured to the end of the housing 14 opposite the discharge end 18 of the bore 16 of the housing. The bonnet 22 is substantially T-shaped in cross section and has a cylindrical portion 24 extending into the bore 16 of the housing. The interface between the bonnet 22 and the housing 14 is sealed. The bonnet 22 is fastened to the corresponding end of the housing 14.

A mandrel 26 is secured in the end portion of the bonnet 22. The interface between the mandrel 26 and the bonnet 22 is sealed. A rod 28 is slidably mounted in an axial bore extending through mandrel 26 and is dynamically sealed therein. One end portion of the rod 28 projects from the corresponding ends of the mandrel 26 and the bonnet 22, and the other end portion of the rod 28 projects from the other end of the mandrel 26 and into the bore 16.

A cylindrical choke member 30 is disposed in bore 16. The choke member 30 extends in the intersection of the bore 16 with the inlet passage 20 to control the flow of fluid from the latter to the former.

A cylindrical shuttle 32 is slidably mounted over the mandrel 26. The shuttle 32 is dynamically sealed within the housing 14 and over the mandrel 26. The shuttle 32 has a reduced-diameter portion 34 that defines, with the inner surface of the housing 14, a fluid chamber 36. Another fluid chamber 38 may be defined between the outer surface of the mandrel 26 and a corresponding inner surface of the bonnet portion 24. The chambers 36 and 38 communicate and receive a control fluid from a passage 40 formed through the bonnet 22. The passage 40 is connected to a hydraulic system, described below, for recirculating the control fluid into and from the passage, which includes a source of control fluid 104 (shown in FIG. 2). The control fluid is introduced into the passage 40, and therefore the chambers 36 and 38, at a predetermined, desired set point pressure as determined by a set point pressure regulator and measured by a gauge located on an associated console.

The control fluid enters the chambers 36 and 38 and acts against the corresponding exposed end portions of the shuttle 32. The shuttle 32 is designed to move so the force caused by the pressure of the control fluid from the chambers 36 and 38 at the predetermined set point pressure acting on the corresponding exposed end portions of the shuttle is equal to the force caused by the pressure of the drilling fluid in the passage 20 acting on the corresponding exposed end portions of the other end of the shuttle and the retainer 42. Thus, the shuttle 32 is normally in a balanced condition.

Figure 2:
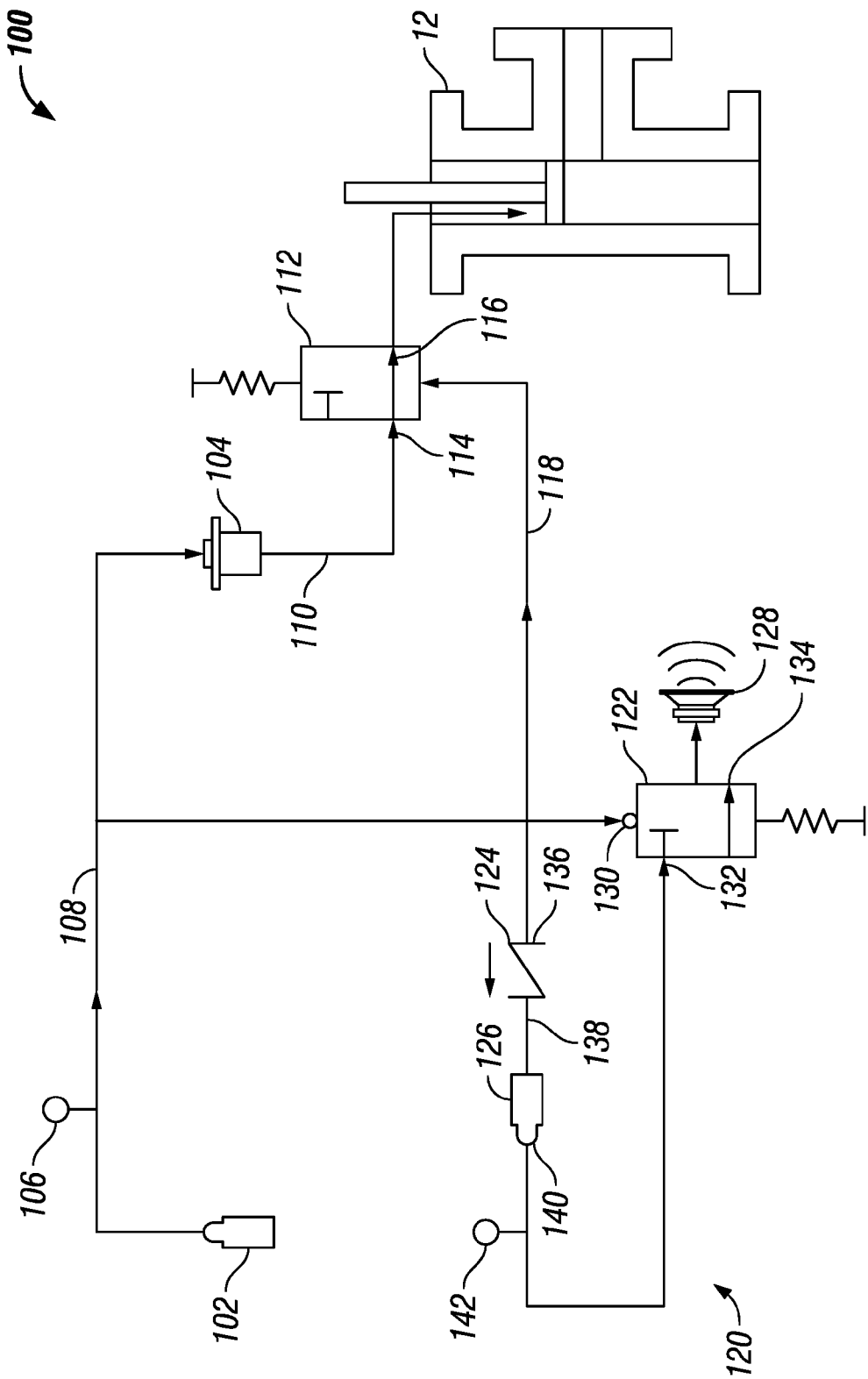
FIG. 2 is a schematic diagram of the failure protection apparatus.

Referring to FIG. 2, the failure protection apparatus 100 is schematically shown. An air source 102 provides air under pressure to the source of control fluid 104. The air applies pressure on the control fluid within the source of control fluid 104, which in turn provides pressure on the shuttle 32 (shown in FIG. 1) to maintain a predetermined pressure within the pressure control assembly. A regulator 106 along the air flow line 108 from air source 102 maintains the air pressure at a predetermined maximum pressure corresponding to a control fluid pressure required to maintain the shuttle 32 of the pressure control assembly 12 in a desired location. A minimum air pressure is required to maintain pressure on the source of control fluid 104 and maintain the shuttle 32 in a balanced position. The regulator 106 may be adjustable to vary the air pressure on the control fluid. The air source 102 may be of any typical source, such as an industrial pressurized air supply or the like.

A description of the hydraulic system for recirculating control fluid is presented herein to the extent necessary for understanding the failure protection apparatus 100. It is appreciated by those of skill in the art that such an hydraulic system will have additional components and features than are disclosed herein.

The control fluid is provided to the chambers 36, 38 of the pressure control assembly 12 from the source of control fluid 104 through a control fluid line 110. A first valve 112 is positioned along the control fluid line 110 between the source of control fluid 104 and the pressure control assembly 12. The first valve 112 has a first fluid port 114 in fluid communication with source of control fluid 104 and a second fluid port 116 in fluid communication with the pressure control assembly 12. First valve 112 is also in fluid communication with air source 102 through an air flow line 118, such that first valve 112 is subjected to the same air pressure as the source of control fluid 104. Fluid communication between first and second fluid ports 114, 116 is maintained so long as air having a minimum air pressure is supplied to first valve 112 by air source 102. When the air pressure of air supplied by air source 102 drops below the minimum air pressure, first valve 112 closes to prevent fluid transfer between first and second fluid ports 114, 116. Thus, when the air pressure is at least a minimum air pressure, first valve 112 permits fluid communication of the control fluid between the source of control fluid 104 and the chambers 36, 38 in housing 14.

By closing when air pressure drops below the minimum air pressure, first valve 112 prevents any fluid communication of control fluid between the source of control fluid 104 and the chambers 36, 38. As a result of this closure when air pressure drops, the shuttle 32 is "frozen" in place until the air pressure is brought back to at least the minimum air pressure required to balance the shuttle 32. By maintaining the shuttle 32 in the position prior to a loss of air pressure, the pressure being controlled by the pressure control assembly 12 is also maintained.

Figure 3:
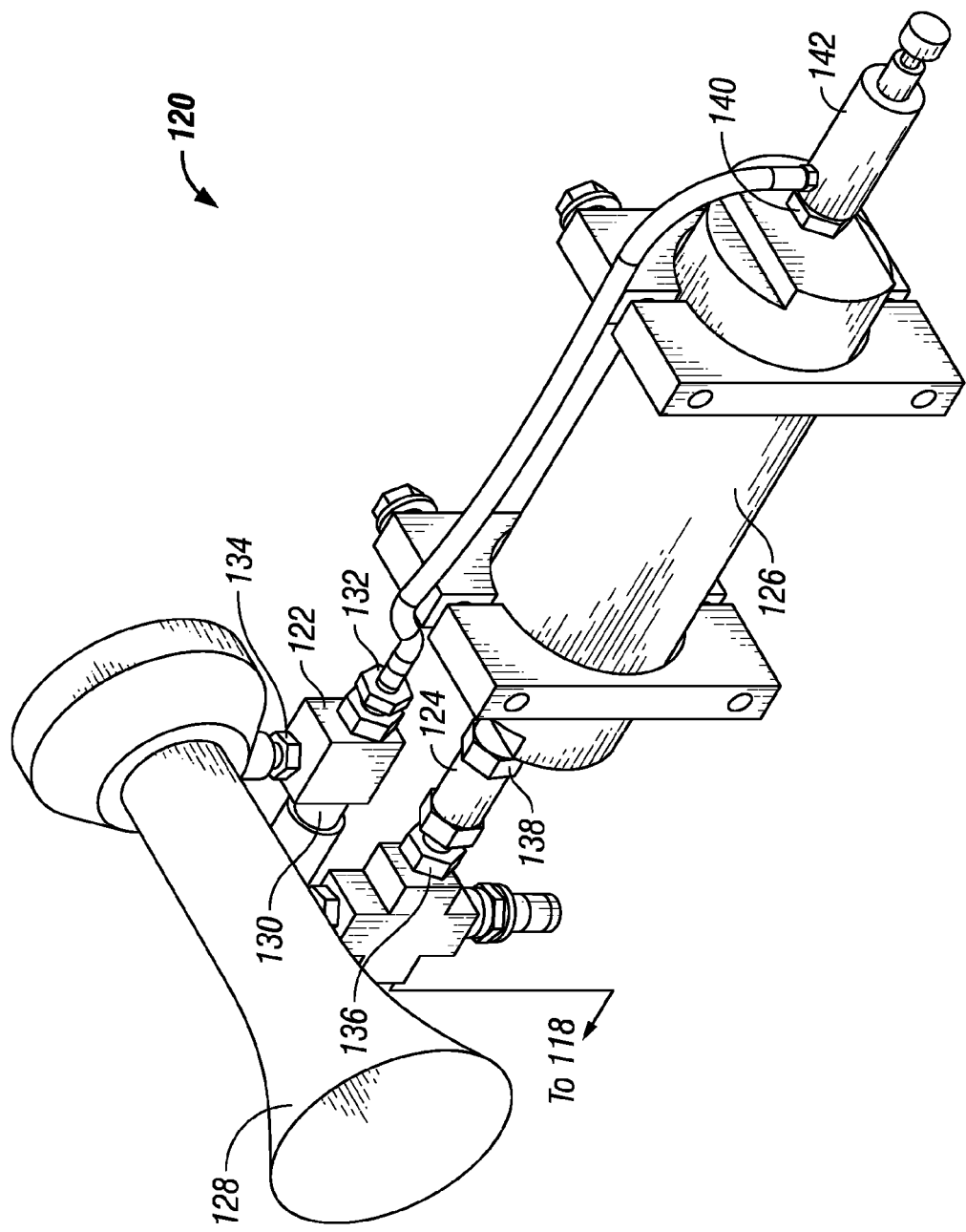
FIG. 3 is a perspective view of the warning system.

A warning system 120, shown in FIGS. 2 and 3, includes a second valve 122, a third valve 124, a pressure container 126, and a warning device 128.

Second valve 122 has a first air inlet 130 in fluid communication with air source 102, such that second valve 122 is subjected to the same air pressure as first valve 112 and the source of control fluid 104. Second valve 122 has a second air inlet 132 and an air outlet 134. When air pressure to first air inlet 130 is at least the minimum air pressure, fluid communication between second air inlet 132 and air outlet 134 is prevented. As will be discussed below, loss of air pressure to first air inlet 130 will result in the communication of air between second air inlet 132 and air outlet 134.

The third valve 124 has a third valve inlet 136 in fluid communication with air source 102 and a third valve outlet 138. Third valve 124 is preferably a check valve. So long as air provided to third valve inlet 136 is at least the minimum air pressure, air will be communicated between third valve inlet 136 and third valve outlet 138. When air pressure to third valve inlet 136 drops below the minimum air pressure, third valve 124 will close, thereby preventing fluid communication between third valve inlet 136 and third valve outlet 138.

Pressure container 126 is preferably a rechargeable gas bottle in fluid communication with third valve outlet 138. Pressure container 126 also has an air outlet 140. The air outlet 140 of pressure container 126 is in fluid communication with the second air inlet 132 of the second valve 122. It is recalled that when air pressure to second valve 122 is at least the minimum air pressure, fluid communication between second air inlet 132 and air outlet 134 is prevented. Thus, when air pressure is at least the minimum air pressure, there is no fluid communication from pressure container 126 through second valve 122.

The warning device 128 is preferably an air-actuated horn in fluid communication with the air outlet 134 of second valve 122. So long as the air pressure to second valve 122 is at least the minimum air pressure, second valve 122 is closed and no air is communicated to warning device 128. As will be discussed below, when the air pressure drops below the minimum air pressure, air is communicated from pressure container 126 through second valve 122 to warning device 128. Warning device 128 emits a warning sound when air is directed into it.

A pressure regulator 142 may be located between air outlet 140 of pressure container 126 and second air inlet 132 of second valve 122. Pressure regulator 142 controls the pressure of air being transmitted from the pressure container 126 to the warning device 128 in the event air pressure drops below the minimum air pressure.

During normal operation of the pressure control assembly 12, the control fluid applies a predetermined pressure to the shuttle 32 that is equal to the pressure applied by the fluid being circulated through the pressure control assembly 12 on the other side of the shuttle 32. While the pressure applied by the control fluid is controlled by a control fluid regulator (not shown), air pressure is applied over the control fluid in the source of control fluid 104. The air pressure applied is at least a minimum air pressure sufficient for the control fluid to maintain the shuttle 32 in the pressure control assembly 12 at a predetermined location for a corresponding pressure. If air pressure drops below this minimum air pressure, the control fluid no longer counter-balances the pressure of the fluid being regulated by the pressure control assembly 12 and the exiting fluid may be well in excess of the desired pressure, potentially damaging downstream equipment.

In the event that air pressure drops below the predetermined minimum air pressure, first valve 112 prevents fluid communication of control fluid between the chambers 36, 38 in pressure control assembly 12 and the source of control fluid 104. This prevents the shuttle 32 from substantially moving and maintains the pressure of fluid being regulated by the pressure control assembly 12.

Simultaneous with the closure of first valve 112, third valve 124 closes, thereby preventing air contained in pressure container 126 from escaping from the container 126 into the upstream air lines. Also, second valve 122 opens to provide fluid communication between second air inlet 132 and air outlet 134. The air contained under pressure within pressure container 126 is then communicated from pressure container 126 through second valve 122 to warning device 128. Pressure regulator 142 controls the flow of air from the pressure container 126. Preferably, pressure container 126 is sized to accommodate air sufficient to sound warning device 128 for a predetermined length of time when pressure regulator 142 is set to a predetermined air pressure. The amount of time in which the warning device 128 sounds may be varied depending upon the application of the failure protection apparatus 120. Some circumstances may warrant more time than others and the length of time of such warning is not limited herein.

When air pressure is restored to the minimum air pressure required to balance shuttle 32, first valve 112 permits fluid communication of control fluid between the source of control fluid 104 and the chambers 36, 38 in pressure control assembly 12 once again. At the same time, second valve 122 closes the path of fluid communication between the pressure container 126 and the warning device 128, ceasing the audible warning signal. Third valve 124 reopens to provide air to recharge pressure container 126. Thus, failure protection apparatus 100 resets itself when the minimum air pressure is restored.

While the claimed subject matter has been described with respect to a limited number of embodiments, those skilled in the art, having benefit of this disclosure, will appreciate that other embodiments can be devised which do not depart from the scope of the claimed subject matter as disclosed herein. Accordingly, the scope of the claimed subject matter should be limited only by the attached claims.

What is claimed is:

1. A failure protection apparatus comprising:
   an air source providing air having an air pressure;
   a source of control fluid in fluid communication with the air source, wherein the air applies the air pressure to the source of control fluid to provide a control fluid having a predetermined control fluid pressure;
   a first valve in fluid communications with the air source and the source of control fluid, wherein the air pressure of the air provided to the first valve is the same air pressure as the air pressure applied to the source of control fluid, the first valve permitting fluid communication of the control fluid between a first fluid port and a second fluid port when the air pressure is at least a minimum air pressure and preventing fluid communication of the control fluid between the first fluid port and the second fluid port when the air pressure is below the minimum air pressure;
   a pressure control assembly in fluid communication with the second fluid port, the pressure control assembly containing a portion of the control fluid at the predetermined control fluid pressure, wherein the predetermined control fluid pressure is maintained when the air pressure changes from at least a minimum air pressure to below the minimum air pressure;
   a second valve in fluid communication with the air source, the second valve preventing communication of air between an air inlet and an air outlet when the air pressure from the air source is at least the minimum air pressure and permitting communication of air between the air inlet and the air outlet when the air pressure from the air source is below the minimum air pressure;
   a third valve in fluid communication with the air source, the third valve permitting communication of air to a third valve outlet when the air pressure from the air source is at least the minimum air pressure and preventing communication of air to the third valve outlet when the air pressure from the air source is below the minimum air pressure;
   a pressure container in fluid communication with the third valve outlet and having a pressure container air outlet, wherein the pressure container air outlet is in fluid communication with the air inlet of the second valve; and
   a warning device in fluid communication with the air outlet of the second valve and operable to emit sound when air is communicated from the air outlet.

2. The apparatus of claim 1, further comprising:
   a pressure regulator between the air outlet of the pressure container and the air inlet of the second valve.

3. The apparatus of claim 1, wherein the warning device is an air horn.

4. The apparatus of claim 1, wherein the third valve is a check valve.

5. The apparatus of claim 1, wherein the pressure container is a rechargeable gas bottle.

6. A failure protection apparatus comprising:
   an air source providing air having an air pressure;
   a pressurized hydraulic reservoir in fluid communication with the air source, wherein the air applies the air pressure to the reservoir to provide a control fluid having a predetermined control fluid pressure;
   a first valve in fluid communications with the air source and the pressurized hydraulic reservoir, wherein the air pressure of the air provided to the first valve is the same air pressure as the air pressure applied to the reservoir, the first valve permitting fluid communication of the control fluid between the pressurized hydraulic reservoir and a chamber in a housing of a pressure control assembly when the air pressure is at least a minimum air pressure and preventing fluid communication of the control fluid between the reservoir and the chamber when the air pressure is below the minimum air pressure, wherein the chamber contains a portion of the control fluid at the predetermined control fluid pressure that is maintained when the air pressure changes from at least a minimum air pressure to below the minimum air pressure;
   a second valve having a first air inlet in fluid communication with the air source, a second air inlet, and an air outlet, wherein the second valve prevents communication of air between the second air inlet and the air outlet when the air pressure from the air source is at least the minimum air pressure and permits communication of air between the second air inlet and the air outlet when the air pressure from the air source is below the minimum air pressure;
   a third valve having a third valve inlet and a third valve outlet, wherein the third valve inlet is in fluid communication with the air source, and wherein the third valve permits communication of air from the third valve inlet to the third valve outlet when the air pressure from the air source is at least the minimum air pressure and prevents communication of air between the third valve inlet and the third valve outlet when the air pressure from the air source is below the minimum air pressure;

a pressure container in fluid communication with the third valve outlet and having a pressure container air outlet, wherein the pressure container air outlet is in fluid communication with the second air inlet of the second valve; and an air-actuated warning device in fluid communication with the air outlet of the second valve, wherein the warning device emits a sound when air is communicated from the pressure container through the second valve.

7. The apparatus of claim 6 further comprising:
a pressure regulator between the air outlet of the pressure container and the second air inlet of the second valve.

8. The apparatus of claim 6 wherein the warning device is an air horn.

9. The apparatus of claim 6 wherein the third valve is a check valve.

10. The apparatus of claim 6 wherein the pressure container is a rechargeable gas bottle.

11. A pressure control apparatus comprising:
an air source providing air having an air pressure;
a source of control fluid in fluid communication with the air source, wherein the air applies the air pressure to the source of control fluid to provide a control fluid having a predetermined control fluid pressure;
a pressure control assembly comprising:
    a housing having an inlet passage, an axial bore a portion of which forms an outlet passage, and a chamber, wherein the chamber contains a portion of the control fluid at the predetermined control fluid pressure;
    a choke member adapted for movement in the housing to control the flow of fluid from the inlet passage to the outlet passage, the fluid applying a force on one end of the choke member;
    a mandrel fixed to the housing and extending in another portion of the bore; and
    a shuttle connected to the choke member and slidably mounted on the mandrel, the shuttle in fluid communication with the chamber such that the portion of the control fluid applies an equal force on an end portion of the shuttle to control the position of the choke member in a manner to exert a back pressure on the fluid in the inlet passage;
a first valve in fluid communications with the air source and the source of control fluid, wherein the air pressure of the air provided to the first valve is the same air pressure as the air pressure applied to the source of control fluid, the first valve permitting fluid communication of the control fluid between the source of control fluid and the chamber of the pressure control assembly when the air pressure is at least a minimum air pressure and preventing fluid communication of the control fluid between the source of control fluid and the chamber when the air pressure is below the minimum air pressure, wherein the predetermined control fluid pressure of the portion of the control fluid within the chamber is maintained when the air pressure changes from at least a minimum air pressure to below the minimum air pressure;

a second valve having a first air inlet in fluid communication with the air source, a second air inlet, and an air outlet, wherein the second valve prevents communication of air between the second air inlet and the air outlet when the air pressure from the air source is at least the minimum air pressure and permits communication of air between the second air inlet and the air outlet when the air pressure from the air source is below the minimum air pressure;

a third valve having a third valve inlet and a third valve outlet, wherein the third valve inlet is in fluid communication with the air source, and wherein the third valve permits communication of air from the third valve inlet to the third valve outlet when the air pressure from the air source is at least the minimum air pressure and prevents communication of air between the third valve inlet and the third valve outlet when the air pressure from the air source is below the minimum air pressure;

a pressure container in fluid communication with the third valve outlet and having a pressure container air outlet, wherein the pressure container air outlet is in fluid communication with the second air inlet of the second valve; and a warning device in fluid communication with the air outlet of the second valve, wherein the warning device emits a sound when air is communicated from the pressure container through the second valve.

12. The pressure control apparatus of claim 11 further comprising:
a pressure regulator between the air outlet of the pressure container and the second air inlet of the second valve.

13. The pressure control apparatus of claim 11 wherein the warning device is an air-actuated horn.

14. The pressure control apparatus of claim 11 wherein the choke member is movable in the housing to and from a fully closed position, a fully open position, and a standard operating position between the fully closed position and the fully open position.

15. The pressure control apparatus of claim 14 wherein the choke member exerts the back pressure on the fluid in the closed position and in the standard operating position.

16. The pressure control apparatus of claim 11 further comprising:
an air source pressure regulator between the air source and the source of control fluid, the first valve, the first air inlet of the second valve, and the third valve inlet;
wherein the air source pressure regulator regulates the air pressure of the air from the air source.

* * * * *